(12) United States Patent
Crist

(10) Patent No.: US 8,888,627 B2
(45) Date of Patent: Nov. 18, 2014

(54) ONE-WAY DAMPED OVER-ARM TENSIONER

(75) Inventor: Robert J. Crist, Bentonville, AR (US)

(73) Assignee: Dayco IP Holdings, LLC, Springfield, MO (US)

( * ) Notice: Subject to any disclaimer, the term of this patent is extended or adjusted under 35 U.S.C. 154(b) by 287 days.

(21) Appl. No.: 12/786,825

(22) Filed: May 25, 2010

(65) Prior Publication Data

US 2011/0294615 A1    Dec. 1, 2011

(51) Int. Cl.
*F16H 7/12* (2006.01)
*F16H 7/08* (2006.01)

(52) U.S. Cl.
CPC ........ *F16H 7/1218* (2013.01); *F16H 2007/081* (2013.01); *F16H 2007/084* (2013.01); *F16H 2007/0893* (2013.01)
USPC .......................................... 474/135; 474/133

(58) Field of Classification Search
CPC .................. F16H 2007/081; F16H 2007/0893; F16H 7/1218; F16H 7/1281
USPC .................................................. 474/133–135
See application file for complete search history.

(56) References Cited

U.S. PATENT DOCUMENTS

| | | |
|---|---|---|
| 2,499,219 A | 2/1950 | Hemmeter |
| 4,483,430 A | 11/1984 | Carmichael et al. |
| 4,509,933 A | 4/1985 | Miranti, Jr. et al. |
| 4,541,516 A | 9/1985 | Fenzel |
| 4,583,962 A | 4/1986 | Bytzek et al. |
| 4,596,538 A | 6/1986 | Henderson |
| 4,661,087 A | 4/1987 | Henderson |
| 4,662,861 A | 5/1987 | Seung et al. |
| 4,698,049 A * | 10/1987 | Bytzek et al. ................. 474/135 |
| 4,822,322 A | 4/1989 | Martin |
| 4,826,471 A * | 5/1989 | Ushio ........................... 474/135 |
| 4,832,665 A | 5/1989 | Kadota et al. |
| 4,869,353 A | 9/1989 | Ohtsuki et al. |
| 4,878,885 A | 11/1989 | Brandenstein et al. |
| 4,971,589 A | 11/1990 | Sidwell et al. |

(Continued)

FOREIGN PATENT DOCUMENTS

| | | |
|---|---|---|
| CN | 1490502 | 4/2004 |
| DE | 4300178 | 4/1994 |

(Continued)

OTHER PUBLICATIONS

CA, Office Action, Canadian Application No. 2,723,044, dated Aug. 1, 2011.

(Continued)

*Primary Examiner* — Henry Liu
(74) *Attorney, Agent, or Firm* — Thompson Hine, L.L.P.

(57) ABSTRACT

A tensioner for a power transmitting element in a drive system is disclosed. The tensioner comprises a threaded shaft that includes threading and at least one non-threaded end and defines a pivot axis, an arm rotatable about the pivot axis on the non-threaded end of the threaded shaft, a torsion element biasing the arm to rotate about the pivot axis, a threaded nut threadedly connected to the threaded shaft. The threaded nut has a first surface in frictional engagement with the arm and is rotatable about the threading. The threaded nut acts as a one-way limited slip clutch to provide asymmetric damping to the arm and controlled resisting torque in a variable relative proportion compared to the mean torque and returning torque.

23 Claims, 3 Drawing Sheets

(56) References Cited

U.S. PATENT DOCUMENTS

| | | | |
|---|---|---|---|
| 5,015,217 A | 5/1991 | Henderson | |
| 5,035,679 A | 7/1991 | Green et al. | |
| 5,057,059 A | 10/1991 | Sidwell et al. | |
| 5,096,035 A | 3/1992 | Bradfield | |
| 5,149,306 A | 9/1992 | Sidwell et al. | |
| 5,209,705 A | 5/1993 | Gregg | |
| 5,215,504 A | 6/1993 | Wong et al. | |
| 5,234,385 A * | 8/1993 | Kawashima et al. | 474/135 |
| 5,250,009 A | 10/1993 | Sidwell et al. | |
| 5,334,109 A * | 8/1994 | Izutsu et al. | 474/135 |
| 5,370,585 A | 12/1994 | Thomey et al. | |
| 5,382,198 A | 1/1995 | Janne | |
| 5,478,285 A | 12/1995 | Bakker et al. | |
| 5,558,370 A | 9/1996 | Behr | |
| 5,575,727 A | 11/1996 | Gardner et al. | |
| 5,598,913 A | 2/1997 | Monahan et al. | |
| 5,620,385 A * | 4/1997 | Cascionale et al. | 474/112 |
| 5,692,482 A | 12/1997 | Shimizu et al. | |
| 5,772,549 A | 6/1998 | Berndt et al. | |
| 5,795,257 A | 8/1998 | Giese et al. | |
| 5,803,850 A | 9/1998 | Hong et al. | |
| 5,827,143 A | 10/1998 | Monahan et al. | |
| 6,004,235 A | 12/1999 | Ohta et al. | |
| 6,044,943 A | 4/2000 | Bytzek et al. | |
| 6,083,130 A | 7/2000 | Mevissen et al. | |
| 6,161,841 A | 12/2000 | Shaw | |
| 6,193,040 B1 | 2/2001 | Cerny | |
| 6,217,470 B1 | 4/2001 | Quintus | |
| 6,231,465 B1 | 5/2001 | Quintus | |
| 6,264,578 B1 | 7/2001 | Ayukawa | |
| 6,361,459 B1 | 3/2002 | Serkh et al. | |
| 6,375,588 B1 * | 4/2002 | Frankowski et al. | 474/112 |
| 6,394,247 B1 | 5/2002 | Monahan et al. | |
| 6,394,248 B1 | 5/2002 | Monahan et al. | |
| 6,422,962 B1 | 7/2002 | Lehtovaara et al. | |
| 6,478,118 B2 | 11/2002 | Astrom et al. | |
| 6,554,318 B2 | 4/2003 | Kohut et al. | |
| 6,571,924 B2 | 6/2003 | Murata et al. | |
| 6,582,332 B2 | 6/2003 | Serkh | |
| 6,588,560 B1 | 7/2003 | Fujiwara | |
| 6,592,482 B2 | 7/2003 | Serkh | |
| 6,609,988 B1 | 8/2003 | Liu et al. | |
| 6,637,570 B2 | 10/2003 | Miller et al. | |
| 6,652,401 B2 | 11/2003 | Liu | |
| 6,834,631 B1 | 12/2004 | Blackburn et al. | |
| 6,863,631 B2 | 3/2005 | Meckstroth et al. | |
| 6,893,368 B2 | 5/2005 | Fujiwara et al. | |
| 7,104,909 B2 | 9/2006 | Asbeck et al. | |
| 7,186,196 B2 | 3/2007 | Quintus | |
| 7,347,309 B2 | 3/2008 | Wiesneth et al. | |
| 7,367,908 B2 * | 5/2008 | Lemberger et al. | 474/138 |
| 7,448,972 B2 | 11/2008 | Garabello et al. | |
| 7,644,814 B2 | 1/2010 | Beattie | |
| 7,867,119 B2 | 1/2011 | Brunetiere | |
| 2002/0119850 A1 * | 8/2002 | Dutil | 474/135 |
| 2003/0008739 A1 | 1/2003 | Asbeck et al. | |
| 2003/0098215 A1 | 5/2003 | Miller et al. | |
| 2004/0112700 A1 | 6/2004 | Liston et al. | |
| 2004/0171448 A1 * | 9/2004 | Lemberger et al. | 474/135 |
| 2007/0010361 A1 * | 1/2007 | Kobelev et al. | 474/115 |
| 2007/0021253 A1 * | 1/2007 | Kobelev et al. | 474/135 |
| 2007/0066426 A1 | 3/2007 | Kamdem et al. | |
| 2008/0112658 A1 | 5/2008 | Justin | |
| 2008/0194366 A1 * | 8/2008 | Mevissen et al. | 474/135 |
| 2008/0293527 A1 * | 11/2008 | D'Amicantonio et al. | 474/135 |
| 2009/0272618 A1 | 11/2009 | Pendergrass et al. | |
| 2009/0275432 A1 * | 11/2009 | Dell | 474/135 |
| 2010/0113201 A1 | 5/2010 | Lannutti | |
| 2010/0147646 A1 | 6/2010 | Lannutti et al. | |

FOREIGN PATENT DOCUMENTS

| | | |
|---|---|---|
| EP | 1277989 | 2/2003 |
| EP | 1596098 | 11/2005 |
| EP | 1736689 | 12/2006 |
| EP | 1754914 | 2/2007 |
| EP | 2154394 | 2/2010 |
| FR | 1100460 | 9/1955 |
| FR | 1181842 | 6/1959 |
| JP | 53-115251 | 10/1978 |
| JP | 55-45040 | 3/1980 |
| JP | 02089838 | 3/1990 |
| JP | 02102956 | 4/1990 |
| JP | 05272606 | 10/1993 |
| JP | 7-190085 | 7/1995 |
| JP | 2000-227128 | 8/2000 |
| WO | 2004/109247 | 12/2004 |
| WO | 2006/099731 | 9/2006 |
| WO | 2009/134676 | 11/2009 |

OTHER PUBLICATIONS

PCT, International Search Report and Written Opinion, International Application No. PCT/US2011/036009, dated Aug. 15, 2011.
PCT, International Search Report, International Application No. PCT/US2009/041573 (mailed Jun. 11, 2009; published Feb. 25, 2010).
PCT, International Preliminary Report on Patentability, International Application No. PCT/US2009/041573 (Oct. 17, 2010).
US, Office Action, U.S. Appl. No. 12/112,393 (Sep. 1, 2010).
US, Notice of Allowance, U.S. Appl. No. 12/112,393 (Dec. 17, 2010).
PCT, International Search Report and Written Opinion, International Application No. PCT/US2011/023541 (Apr. 1, 2011).
PCT, International Search Report and Written Opinion, International Application No. PCT/US2012/029320 (Jun. 8, 2012).
English translation of Office Action (Notice of Reason(s) for Rejection), Japanese Application No. 2011-507546 (Feb. 26, 2013).
KR, Office Action, Korean Application No. 7024789/2010, dated Oct. 17, 2012.
US, Office Action, U.S. Appl. No. 12/713,580, dated Nov. 5, 2012.
European Search Report and Search Opinion, European Application No. 09739478.7 (Jul. 10, 2013).
Office Action, U.S. Appl. No. 13/050,019 (Sep. 25, 2013).
AU, Patent Examination Report No. 1, Australian Application No. 2011218879 (Jul. 22, 2013).
CA, Examination Report, Canadian Application No. 2,788,516 (Mar. 3, 2014).
CN, Office Action, Chinese Application No. 200980115435.8 (Sep. 29, 2012).
EP, Search Report, European Application No. 11747845.3 (Mar. 18, 2014).
EP, Search Report, European Application No. 11787102.0 (Feb. 26, 2014).
US, Notice of Allowance, U.S. Appl. No. 12/713,580 (May 22, 2013).
US, Notice of Allowance, U.S. Appl. No. 13/050,019 (Apr. 10, 2014).

* cited by examiner

ONE-WAY DAMPED OVER-ARM TENSIONER

TECHNICAL FIELD

The present application relates generally to belt tensioners and more particularly to a belt tensioner having a damping mechanism that provides asymmetric damping.

BACKGROUND

Belt tensioners use a system or mechanism to dampen tensioner movement which minimizes steady state vibrations or transient events that cause unwanted belt slip or noise. The required magnitude of this damping depends on many drive factors including geometry, accessory loads, accessory inertia, engine duty cycle and others. For instance, drive systems that have higher torsional input or certain transient dynamic conditions may require higher damping to sufficiently control tensioner movement. Although higher damping is very effective at controlling arm movement, it can also be detrimental to other critical tensioner functions (e.g. slow or no response to slack belt conditions). In addition, variation or change in damping that occurs as a result of manufacturing variation, operating temperature and component break-in or wear can also cause the tensioner to be unresponsive.

Damping derived by sliding friction is common among belt tensioners. One particular method involves friction between two surfaces that are perpendicular to the tensioner axis of rotation as in U.S. Pat. No. 4,661,087 to Henderson. The first surface is attached to the tensioner base; the second rotates with the tensioner arm. A spring forces the surfaces together and damping friction is created when the two surfaces slide relative to each other.

Other solutions use wedges that increase damper friction during wind-up, for example in U.S. Pat. Nos. 6,361,459, 4,878,885, and 6,863,631, or spring loaded self-energizing brake shoe elements, for example U.S. Pat. Nos. 6,231,465, 6,582,332, and 6,609,988. These designs, however, tend to be complex with certain geometric limitations.

One-way clutch mechanisms have been proposed, for example in U.S. Pat. Nos. 4,583,962 and 6,422,962, for timing belt tensioners for the purpose of preventing or limiting back travel to prevent tooth jump. These "ratcheting" tensioners, however, lack the ability to relieve belt tension sufficiently when not required. Other belt tensioner proposals include, for example U.S. Pat. Nos. 5,692,482, 4,832,665, and 6,375,588, use of a one-way device coupled to a viscous damper. Although these devices offer good functionality, retention of the viscous fluid throughout the service life can be difficult. Yet another design uses the clamping action of a wrap spring clutch to provide frictional damping, as disclosed in U.S. Patent App. Publication 2003/0008739. For such construction precise geometric control difficult, in turn making clutch disengagement erratic (lockup).

Most friction dampers provide equal resistance to motion regardless of the direction of tensioner movement. However, tensioner damping that is unequal, or asymmetric, has been shown beneficial in belt tension responsiveness, at higher damping levels, as compared to typical symmetric systems. An asymmetrically damped tensioner provides damping when additional belt tension is encountered but is free to respond to slack belt conditions. Although asymmetric functionality may not be required for all other front end accessory drive tensioners, the potential for increased service life, solving other transient dynamic system problems including belt slip, or simply making the tensioner less sensitive to damping variation sometimes makes it a desirable design option.

The aforementioned damping mechanisms and tensioner designs are not ideal in all package constructions, such as with a torsion bar spring tensioner. Accordingly, a new damping mechanism and tensioner design is desired.

SUMMARY

Torsion bar tensioners, like the one in the published European patent application EP1596098, have limited damping capacity, and especially lack adequate damping and especially lack asymmetric damping. Herein, in one aspect, is disclosed a tensioner for a power transmitting element in a drive system that is biased by a torsion bar and has an asymmetric damping mechanism.

In one aspect, a tensioner is disclosed that includes a threaded shaft that defines a pivot axis and includes threading and at least one non-threaded end, an arm rotatable about the pivot axis on the non-threaded end of the threaded shaft, a torsion bar biasing the arm to rotate about the pivot axis, and a threaded nut that has a first surface in frictional engagement with the arm. The threaded nut is rotatable about the threading to provide asymmetric damping to the arm.

In another aspect, the tensioner may include a base and a threaded shaft non-rotatably attached to the base. The shaft defines a pivot axis and includes threading and at least one non-threaded end. The tensioner also includes an arm rotatable about the pivot axis on the non-threaded end of the threaded shaft and a torsion bar attached to the arm and the base. The arm has distal end for receiving a pulley assembly and a proximal end defining a damping cavity that has a first friction surface. Within the damping cavity, a threaded nut is received that is also threadedly connected to the threading of the threaded shaft. The threaded nut has a top that has a second friction surface in frictional engagement with the first friction surface of the damping cavity. The threaded nut rotates about the threading of the threaded shaft in response to movement of the arm and when the arm rotates in a winding direction the threaded nut moves about the threading which translates the threaded nut axially into increased frictional engagement with the arm to provide damping.

DETAILED DESCRIPTION

The damping mechanism and tensioner disclosed herein provide an asymmetric frictional damper as likened in function to a cone clutch with ramp thread activation. The tensioner is typically part of a power system where the tensioner provides tension to a power transmitting element such as a belt, chain, or other continuous loop that are in a system driven by at least one source and that also drives at least one accessory. The power transmitting element and the tensioner operate in concert with the tensioner providing tension to the power transmitting element as needed and responding to dynamic conditions thereof. Tensioning a slack power transmitting element is an unwinding of a wound-up tensioner which will be referred to herein as the tensioning direction T.

In the opposite direction, referred to herein as the winding direction W, a winding up of the tensioner occurs in response to a prevailing force of the power transmitting element which is tightening in the span where the tensioner resides. The winding of the tensioner may have some potentially undesirable effects upon the drive system's intended function. To mitigate these undesirable effects it may be helpful to have a damper or damping mechanism, for example a frictional damper, incorporated in the tensioner to resist the movement of the power transmitting element, without adversely affecting rotation of the tensioner, in particular its arm to tension the power transmitting element. This kind of frictional damping is generally known as asymmetric damping.

Figure 1:
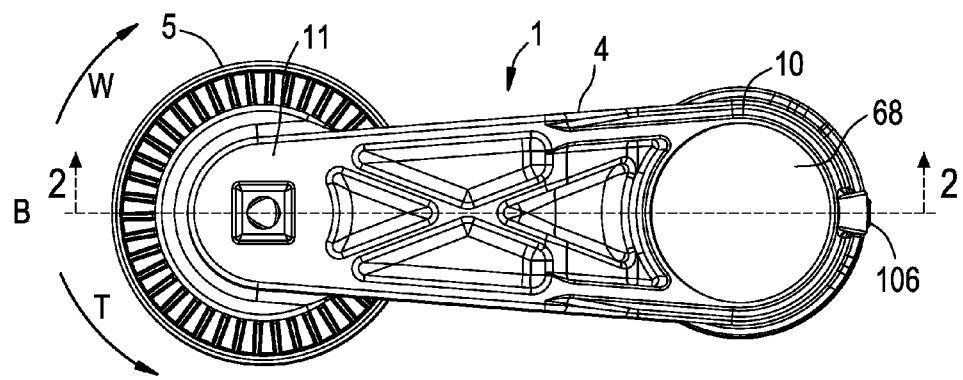
FIG. 1 is a top view of a tensioner in accordance with the present invention.
Figure 2:
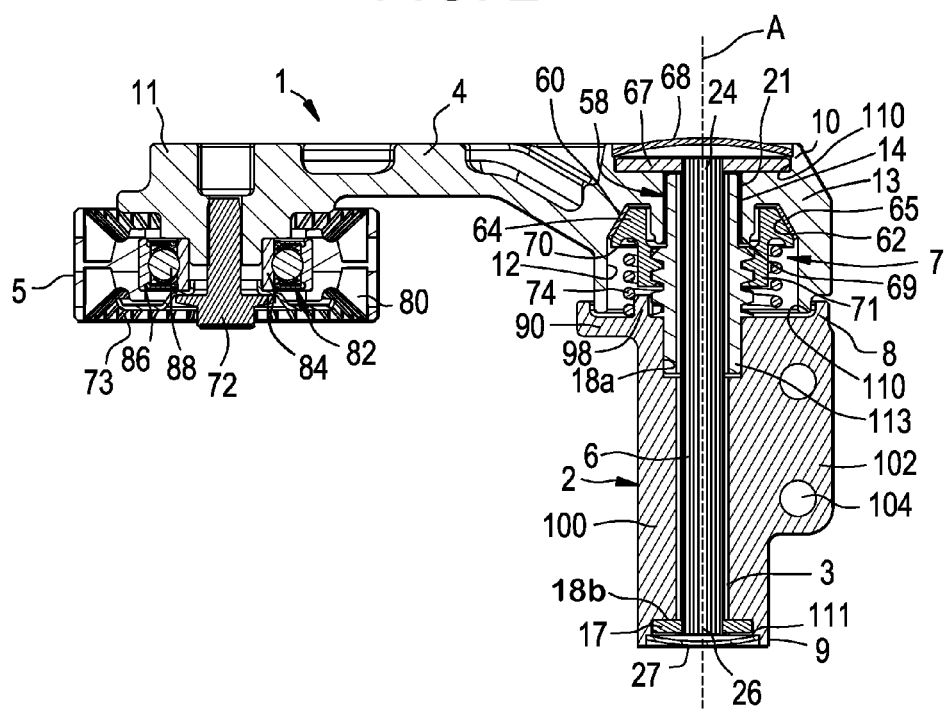
FIG. 2 is a cross-sectional view of the tensioner taken along line 2-2 in FIG. 1.

Referring to FIGS. 1-4, a tensioner, generally designated 1, for tensioning a power transmitting element such as a belt of an internal combustion engine achieves asymmetric damping in part by the use of a damping mechanism 7 that has mating, engaging friction surfaces 60, 62, as more clearly shown in FIG. 2. The engaging friction surfaces 60, 62 of the damping cavity 12 and threaded nut 64 may be formed from or coated with or have adhered thereto a friction or brake material such as a commercially available material with medium to high friction, good stability and good wear characteristics, similar to brake pad materials or high performance polymers to reduce wear on the mating friction surfaces. In one embodiment, the material may be a non-asbestos molded material.

The tensioner 1 includes an arm 4 that has a distal end 11 for receiving a pulley assembly 5 that may cooperate with a belt and has a proximal end 10 having a housing 13 that defines a damping cavity 12 with a first friction surface 60 and a bore 21 extending through the housing 13 transverse to the longitudinal axis B of the arm 4. The proximal end 10 defines an axis of rotation A that extends through the bore 21 as shown in FIG. 2.

Referring to FIG. 2, the pulley assembly 5 rotatable about the axis of rotation C that includes a pulley body 80 with a bearing 82. The bearing 82 includes an inner race 84, outer race 86, and rolling elements 88 between the inner and outer races. The pulley assembly 5 is connected to the arm 4 by a fastener 72 such as a bolt, screw, pin, rivet, or the like. The fastener 72 may hold a dust cover 73 in place to protect the bearing 82 from contaminants.

The damping cavity 12 at the proximal end 10 of the arm 4 receives, as part of the damping mechanism 7, a threaded shaft 113, a damper spring 74, and a threaded nut 64 having a second friction surface 62 for mating with the first friction surface 60 of the arm 4, and optionally a damper bushing 65, each described in more detail below. An elongate base 2 is connected to the damping cavity 12 to close the cavity.

The elongate base 2 has a first end 8 and a second end 9, and a longitudinal cavity 3 extending through the base 2 from the first end 8 to the second end 9. The first end 8 includes an opening 99 into the longitudinal cavity and a plate 90 extending outward circumferentially from the opening. The plate 90 is designed to cover and/or close the damping cavity 12. The plate 90 also aligns the longitudinal cavity 3 with the bore 21 extending through the damping cavity 12. The plate 90 has a flange 92 about its periphery that extends away from the rest of the base 2 and includes a first tab 94 and a second tab 96. Plate 90 also includes a spring guide 98 positioned adjacent the opening 99 into the longitudinal cavity 3. The spring guide 98 is an elongate rib that extends along a portion of the periphery of the opening 99.

Figure 3:
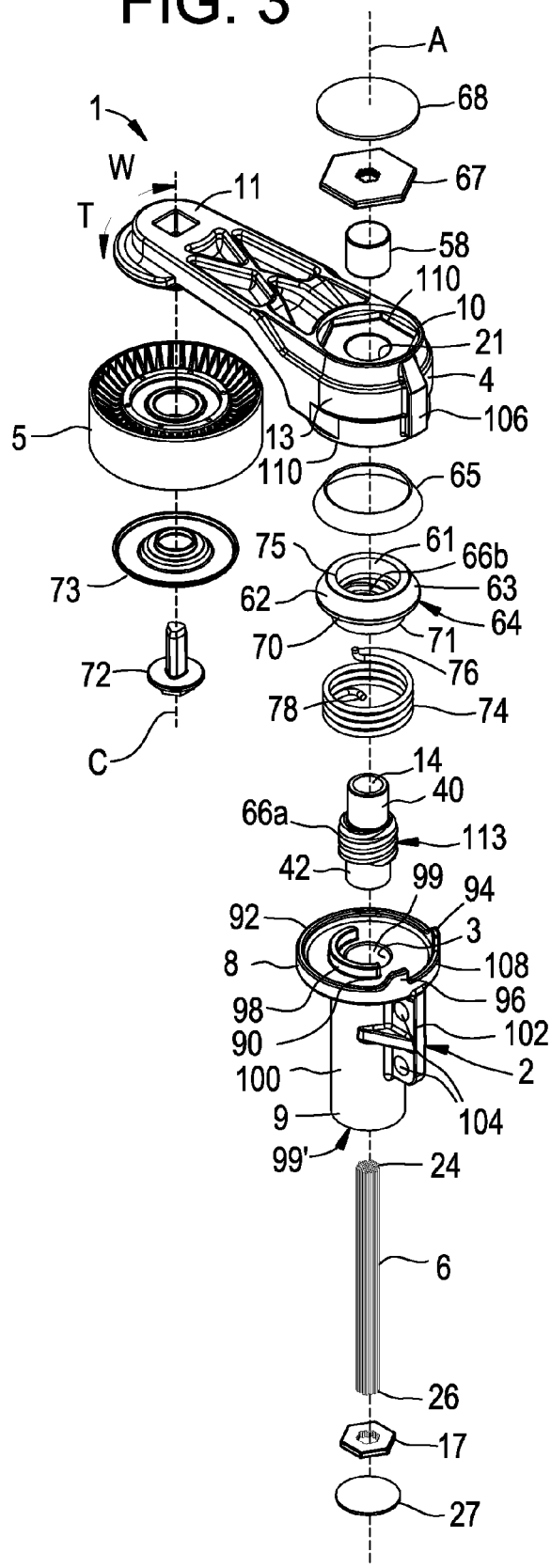
FIG. 3 is an exploded view of the tensioner of FIG. 1.
Figure 4:
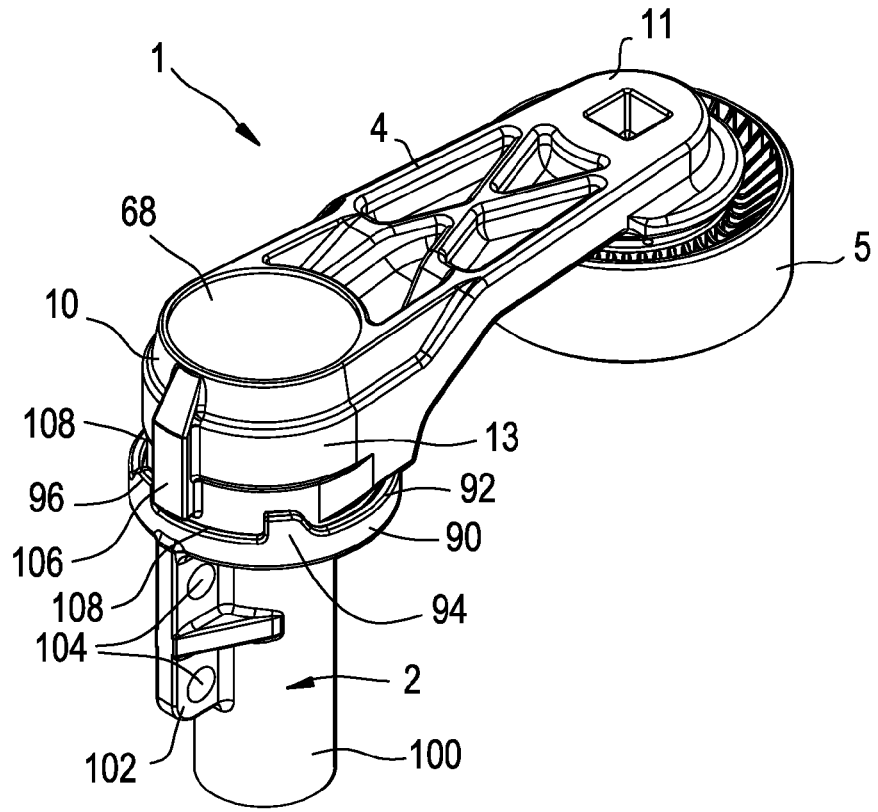
FIG. 4 is a side perspective view of the tensioner of FIG. 1.

Extending from plate 90 to the second end of the base 2 is a housing 100 that defines the longitudinal cavity 3. As shown in FIGS. 2-3, the housing 100 is smaller in width than plate 90 and is cylindrical. The housing, however, is not limited to being smaller or being cylindrical and may be cuboidal, generally conical or pyramidal, or even irregularly shaped as long as it can provide a longitudinal cavity for the torsion element. Housing 100 also includes a mounting feature, i.e., bracket 102, but is not limited to a bracket. One of skill in the art will appreciate that known mounting features and techniques may be suitable to mount the housing in place. The mounting feature may have holes 104 or any other well known device or member for mounting the tensioner 1 for engagement with a power transmitting element, such as a belt. The mounting feature fixedly mounts the base 2 to a surface or structure in the power transmission assembly so the base remains relatively fixed in orientation and does not rotate about the rotation axis A. The base is substantially stationary.

Like the first end 8, the second end 9 of the base 2 has an opening 99' into the longitudinal cavity 3. The longitudinal cavity 3 houses at least a portion of a torsion bar 6 that biases the arm 4 to rotate when the tensioner 1 is assembled. Integral with the longitudinal cavity 3 is a first seat 18a in the first end 8 and a second seat 18b in the second end 9 of the base 2. The first seat 18a receives the threaded shaft 113 and the second seat 18b receives a first nut 17 to fixedly attach the first end 26 of the torsion element 6 to the housing 100. As shown in FIG. 3, the first nut 17 may be a hexagonal nut that fits into a hexagonal recess 111 in the second end 9 of the base 2. This is merely one example of how to fixedly attach the torsion bar to the arm, and one of skill in the art will appreciate that many well known method are available for connecting the torsion bar to the base. Additionally, the second end 9 of the housing 2 receives a first plug 27 to close the housing 100.

The torsion element 6 is shown as a torsion bar in the embodiment in FIGS. 1-4, but it is not limited thereto. One of skill in the art will appreciate that the torsion element may be a torsion spring. The torsion element has a first end 24 and a second end 26 and has its longitudinal axis co-axially aligned with the axis of rotation A (FIG. 2). The first end 24 connects the torsion element 6 fixedly to the arm 4, so the torsion element 6 can bias the arm in the tensioning direction T and can be wound when the arm rotates in the winding direction W. The second end 26 of the torsion element is connected as explained in the preceding paragraph. In the embodiment in FIGS. 1-4, the torsion element 6 is fixedly attached to the arm 4 by a second nut 67 connected to the first end 24 of the torsion element. The second nut 67 is set into or attaches to the proximal end 10 of the arm, and, as shown, may be a hexagonal nut that fits into a hexagonal recess 110 in the arm 4. This is merely one example of how to fixedly attach the torsion element to the arm, and one of skill in the art will appreciate that many well known method are available for connecting the torsion element to the arm. The tensioner 1 may also include a second plug 68 fitted into or attached to the proximal end 10 of the arm to cover the second nut 67 and keep contaminants from entering the tensioner.

The torsion bar may comprise a bundle of beam elements which are hexagonal in cross section, arranged in a configuration of efficient compactness, and may include a metallic collar (not shown) surrounding and circumferentially tightening the beam elements to prevent the relative detachment of the beam elements under a torsional load as described in published European patent application EP1596098, incorporated herein by reference in its entirety. The torsion bar may be and is preferably pre-loaded for sufficient potential energy to function, to bias the arm 4 in the tensioning direction T. The torsion bar may be pre-loaded by twisting it directly or by rotating the arm in an assembled tensioner in the winding direction W.

The damping mechanism 7 of the tensioner 1 includes a threaded shaft 113 at least partially received in the bore 21 of the arm 4 with the threading 66a extending beyond the bore into the damping cavity 12. The threaded shaft 113 includes a bore 14 extending longitudinally through the shaft, and an upper non-threaded cylindrical end 40 and a lower non-threaded cylindrical end 42 separated from one another by threading 66a. The upper cylindrical end 40 is the portion of the threaded shaft 113 received in bore 21 about which the arm 4 is rotatable. The upper cylindrical end 40 may have a pivot bushing 58 received over it. The pivot bushing may reduce the wear of both the shaft and the hub 69 of the arm 4. The pivot bushing 58 may be an oil impregnated sintered bronze bearing or steel backed bearing with a PTFE liner in the metal shell.

The lower cylindrical end 42 is received in the longitudinal cavity 3 of the base via opening 99 and seats against first seat 18a. In one embodiment, the connection of the lower cylindrical end 42 to the base 2 fixedly attaches the threaded shaft thereto so the threaded shaft 113 does not rotate about the axis of rotation A. Accordingly, the bore 21 in the arm, the bore 14 in the threaded shaft 113, and the longitudinal cavity 3 in the base 2 are coaxially aligned along the axis of rotation A and define a continuous longitudinal cavity for housing the torsion bar. The lower cylindrical end 42 may include a Woodruff key or locking shape that mates with a matching slot in the base, or have an interference fit with the base, or any other connections or configurations for coupling the threaded shaft 113 and base 2 possible as known in the art.

With the threaded shaft 113 fixedly attached to the base 2, a damper spring 74 is received over the shaft 113 and against the outer surface of the spring guide 98. As shown in FIG. 3, the damper spring 74 has an upper spring end 76 and a lower spring end 78. The lower spring end 78 may be curved, hook-shaped, or the like to connect the lower spring end to one end of the spring guide 98, which provides a fixed connection so that movement of other components of the tensioner connected to the upper spring end 76 will wind or unwind the spring. The damper spring 74 may be any spring that is an axial compression spring. In one embodiment, the spring may be a torsion spring, such as a steel wired torsion spring.

The upper spring end 76 is connected to a rotatable, threaded nut 64 that comprises a nut member 71 and a conically-shaped top 63. The threaded nut 64 is threaded onto the threaded shaft 113 with the spring compressed between the threaded nut 64 and the plate 90 of the base. The conically shaped top 63 of the threaded nut 64, as shown in FIGS. 2-3, has an upper friction surface 62 that overhangs the nut member 71 creating an eave 70. The upper friction surface 62 is mateable against the first friction surface 60 in the damping cavity 12 of the arm 4. The eave 70 is connectable to the upper spring end 76 and receives the damper spring's 74 axial force, thus preloading the winding and unwinding as the threaded nut 64 rotates about the axis A. The conically shaped top 63 may include an opening 61 therein that is wider than the threading 66b to receive a hub 69 of the arm 4. The hub 69 may help align the threaded nut 64 in the damping cavity 12 and to maintain that alignment as the threaded nut 64 rotates about the threaded shaft 113.

Arm 4 includes first friction surface 60 in the damping cavity 12 that faces the second friction surface 62 of threaded nut 64. In one embodiment, as shown in FIGS. 2-3, the first and the second friction surfaces 62, 64 are conically-shaped mating surfaces. The first friction surface 62 is generally larger dimensionally, for example larger diameter, than the second friction surface 64 so the second friction surface fits inside the first friction surface. The conically-shaped first and second friction surfaces 62, 64 may be angled at an angle other than perpendicular to the rotational axis A and may slope upward or downward away from axis A. The conically-shaped first and second friction surfaces may be in continuous frictional contact circumferentially about the entire surface or one or both may have areas of greater thickness circumferentially spaced apart about the entire surface that comprises the frictional contact. The first and second friction surfaces 62, 64, while illustrated as conically-shaped, are not limited thereto. In another embodiment, the first and second friction surfaces 62, 64 may be flat planar surfaces, or likened to it with generally homogenous continuous surfaces in hyperbolic, concave or convex shaped surfaces.

Conically-shaped friction surfaces are preferred because they may maximize surface area and in turn decrease wear over that entire surface, thus prolong the life of the damping mechanism. The gradually tapering surfaces direct the forces acting on the threaded nut 64 inwardly toward the helical threads thereby reducing thread pressure and allowing the threaded nut to disengage more freely, which increases system responsiveness. The threaded connection between the threaded shaft's threading 66a and the threaded nut's threading 66b provides for increasing contact pressure in the predominant belt tension resisting direction W versus a relatively lightly induced disengagement of the clutch in the counter-prevailing direction (to rapidly engage the belt in T direction).

A damper bushing 65 may be placed between the first and the second friction surfaces 60, 62. The damper bushing 65 may be a friction material such as any commercially available material with medium to high friction, good stability, and good wear characteristics, similar to that discussed above for the engaging mating surfaces 60, 62. Friction material may be located between other mating surfaces in the tensioner if there is a need to do so. As shown in FIGS. 2-3 the threaded nut 64 may also include a generally planar top surface 75 that can frictionally engage the damping cavity 12. In one embodiment, the damper bushing 65 can be thick enough to keep the top surface 75 from frictionally engaging the damping cavity 12.

The arm 4 of the tensioner may also include a stop 106 on the exterior of the housing 13 for at least a portion of the damping mechanism 7. The stop 106 restricts the motion of the arm 4 when it hits either of the first tab 94 or the second tab 96 projecting from the flange 92 of the base. The first and second tabs 94, 96 define between them an open elongate groove 108 that defines the range of rotational motion of the arm 4. The stop 106 and the tabs 94, 96 work together to prevent the tensioner from losing its pre-load on the torsion element and from over-rotating in the opposite direction.

During operation, the arm 4 of the tensioner 1 is rotatable to tension a power transmitting element in direction T and is rotatable in the opposite direction W, as explained above, in response to tensioning the belt slack or when belt acts to windup tensioner conditions of the power transmitting element, respectively. The arm 4 rotates about the end of the threaded shaft 113, thus, rotating relative to the threaded shaft 113 and relative to the base 2. As described above, arm 4 is fixedly attached to the torsion bar 6. The torsion bar is pre-loaded with a torsional force by winding up the arm in the W direction, such that the torsional force can then act to rotate the arm in the tensioning direction T when the dynamic condition lifting the arm dissipates.

Arm 4 is in frictional contact with the second frictional surface 62 of the threaded nut 64 via the first frictional surface 60 in the arm's damping cavity. The damper spring 74 biases the threaded nut 64 toward the arm 4 to maintain the frictional contact between the first and second frictional surfaces 60, 62 so the arm 4 and threaded nut 64 can rotate together. When the arm 4 rotates due to the biasing of the torsion bar 6 in the tensioning direction T the frictional contact between the arm and the threaded nut 64 rotates the threaded nut 64 in the same direction as the arm. Rotation of the threaded nut 64 moves the threaded nut about the threading 66a of the threaded shaft 113 and thereby translates the threaded nut along the axis of rotation A. Thus, the damper spring 74 is connected to the threaded nut 64 to rotate the threaded nut about the threading 66a of the thread shaft 113 which translates the threaded nut axially into a pre-determined amount of frictional engagement with the arm. As such the spring 74 and the arm 4 work in concert when the system is tensioning the belt.

When the arm 4 is permitted to rotate in the tensioning direction (unwinding the potential energy built up in the torsion bar 6 which acts like a typical torsion spring), the threaded nut 64 rotates on the threading 66a of the threaded shaft 113 in a first direction that translates the threaded nut toward the base 2 to reduce the friction between the arm and the threaded nut. Conversely, when the arm 4 rotates in the wind up direction W, the threaded nut 64 rotates on the threading 66a of the threaded shaft 113 in a second direction, opposite the first direction, that translates the threaded nut toward the arm to increase friction between the arm and the threaded nut. Having increased friction as the threaded nut rotates in the winding direct W (thus resisting the urging of the power transmitting element more so than in the tensioning direction T), while having decreased friction as the threaded nut rotates in the tensioning direction T to more freely take up the belt slack, provides asymmetric damping.

The ability to progressively increase frictional damping relative to displacement of the tensioner arm enables the device to provide greater frictional damping in response to greater displacements of the tensioner arm in the winding direction W. This creates a beneficial feedback loop to combat any possible undesirable effects of wind-up that may occur; as the tensioner arm is driven in the W direction, the frictional damping is applied to resist the wind-up, so that one skilled in the art notices this is directionally asymmetric. Since the damping is directionally asymmetric in nature by design, as the tensioner changes direction of operation—whereby the tensioner arm starts back to tensioning contact with the belt— the amount of frictional damping applied to the motion of the device in the tensioning direction is less than that applied during wind-up.

The asymmetric damping may be tailored such that it will not restrict all movement in the wind-up direction thereby providing additional compliance that is advantageous for some applications. A benefit to the present tensioner is its ability to be a one-way limited slip clutch damping mechanism that provides asymmetric damping to the arm while sustaining a resisting torque. The resisting torque is the torque applied in the winding direction. If the force acting on the belt that rotates the arm in the winding direction becomes higher than the damping mechanism is designed to control, the friction between the first surface and the second surface 60, 62 will be overcome allowing the arm to rotate rather than locking up the tensioner and potentially breaking the belt.

The net surface force between the mating friction first and second surfaces 60, 62 that slide relative to one another can be varied to affect the damping, created from the difference of the resisting torque and the returning torque. The returning torque is the torque applied in the tensioning direction. The net surface force or engagement force between surfaces 60, 62 is equal to the normal force times the coefficient of friction at the surface. Engagement force=normal force*CoF. During operation, the threading 66a of the threaded shaft 113 and the threading of the threaded bore 66b of the nut 64 converts the torsional torque to an axial force (directed along the axis of rotation) proportional to the pitch of the threading and the coefficient of friction between the mating threads. Then, the conically-shaped top 63 of the threaded nut 64 receives those axial forces and converts them into the "normal" or perpendicular direction relative to the second friction surface 62 of the conically-shaped top 63 as directed toward the first friction surface 60. The conically-shaped top 63 directs the normal force as a function of the angle of the mating first and second friction surfaces 60, 62.

In the disclosed tensioner, the geometry of thread pitch and cone angle combine to provide a net normal force upon the clutch surface, i.e., between the mating friction first and second surfaces 60, 62. As illustrated in the graphs, varying the CoF between the mating friction first and second surfaces 60, 62, as well as varying the thread pitch and cone angle and mean torque can be combined for varied resisting and returning torques. In one embodiment the CoF may be about 0.05 to about 0.25. In another embodiment, the CoF may be about 0.1.

The pitch of the threading preferably provides a gentle slope with a minimum sliding coefficient of friction in the assembled tensioner. The thread pitch, as measured by the helix angle, is about 5° to about 75°. More preferably, for typical plastic damping elements, the helix angle is about 20° to about 40°. A helix angle is the angle between any helix and an axial line on its right, circular cylinder or cone.

Figure 5:
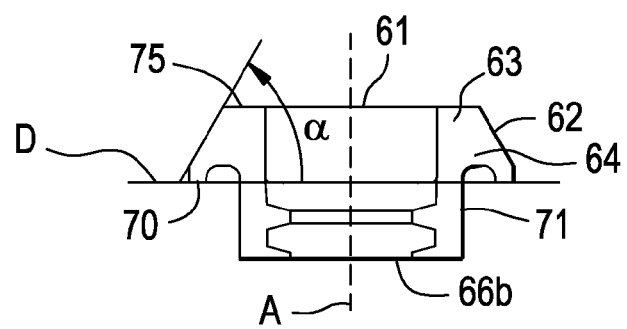
FIG. 5 is a cross-sectional view of a threaded nut with cone angle $\alpha$.

The cone angle of the second friction surface 62 of the threaded nut 64 is represented as angle α shown in FIG. 5. Angle α may be about 45° to about 75°. Angle α is measured between the second friction surface 62 and an axial line D drawn along eave 70 and perpendicular to the rotational axis A, with α measured from the center of the threaded nut out to the second friction surface 62. More preferably, α may be about 60°.

In an alternate embodiment, the threaded shaft 13 may have the upper non-threaded end 40 fixedly attached to the arm 4 and the lower non-threaded end 42 rotatably attached to the base 2. The arm 4 and threaded shaft 13 rotate together relative to the substantially stationary base 2. Otherwise, the tensioner and damping mechanism of this embodiment functions the same as described above to tension a power transmitting element and provide asymmetric damping.

Various parameters can affect operation of the damper mechanism 7 and ultimately vary the amount of asymmetric frictional damping such as thread pitch, quantity of the threads, the orientation of the first and second friction surfaces, the friction material used on or between the first and second friction surfaces, and the characteristics of the damper spring and main spring. These parameters may be independently varied or one or more parameter may be varied together to control or change the damping and/or the resisting and returning torques in concert or independently.

The embodiments of this invention shown in the drawings and described above are exemplary of numerous embodiments that may be made within the scope of the appended claims. It is contemplated that numerous other configurations of the tensioner may be created taking advantage of the disclosed approach. In short, it is the applicant's intention that the scope of the patent issuing herefrom be limited only by the scope of the appended claims.

What is claimed is:
1. A tensioner for a power transmitting element in a drive system comprising:

a threaded shaft defining a pivot axis and comprising threading and at least one non-threaded end;

an arm rotatable about the pivot axis on the at least one non-threaded end of the threaded shaft;

a torsion element biasing the arm to rotate about the pivot axis, the torsion element being attached to a base;

a threaded nut threadedly connected to the threaded shaft, the threaded nut having a first surface in frictional engagement with the arm;

wherein the threaded nut is rotatable relative to both the arm and the base; and wherein the threaded nut is rotatable about the threading on the threaded shaft to provide asymmetric damping to the arm.

2. The tensioner of claim 1 wherein the arm includes a damping cavity that houses the threaded nut, wherein the damping cavity has a second surface in frictional engagement with the first surface of the threaded nut.

3. The tensioner of claim 2 wherein a bushing is positioned between the first surface of the threaded nut and the second surface of the arm.

4. The tensioner of claim 2 wherein the first surface and the second surface are generally conically-shaped.

5. The tensioner of claim 1 further comprising a spring having an axially directed biasing force, the spring being connected to the threaded nut, wherein the spring biases the threaded nut to rotate about the threading of the threaded shaft which translates the threaded nut axially into a pre-determined amount of frictional engagement with the arm.

6. The tensioner of claim 5 wherein the pre-determined amount of frictional engagement couples the arm and the threaded nut for rotation together about the pivot axis, wherein as the arm rotates in a tensioning direction the threaded nut rotates about the threading of the threaded shaft to axially translate the threaded nut away from the arm for decreased frictional engagement with the arm and as the arm rotates in a winding direction the threaded nut rotates about the threading of the threaded shaft which axially translates the threaded nut toward the arm for increased frictional engagement with the arm.

7. The tensioner of claim 1 wherein the base has an elongate housing defining a longitudinal cavity coaxial with the pivot axis, and wherein the elongate housing houses a portion of the torsion element.

8. The tensioner of claim 7 wherein the torsion element is non-rotatably fixed to the elongate housing.

9. The tensioner of claim 7 further comprising a spring having an axially directed biasing force and comprising a first end and a second end, wherein the first end is connected to the threaded nut and the second end is connected to the base.

10. The tensioner of claim 9 wherein the spring urges the threaded nut to rotate about the threading on the threaded shaft to translate the threaded nut axially into a pre-determined amount of frictional engagement with the arm.

11. The tensioner of claim 9 wherein the torsion element is a torsion bar.

12. The tensioner of claim 4 wherein the first surface has a cone angle and the cone angle is about 45° to about 75°.

13. The tensioner of claim 12 wherein the cone angle is about 60°.

14. The tensioner of claim 4 wherein the threading of the threaded nut has a thread pitch of about 5° to about 75°.

15. The tensioner of claim 4 wherein the threading of the threaded nut has a thread pitch of about 20° to about 40°.

16. A tensioner for a power transmitting element in a drive system comprising:

a base defining a pivot axis;

a tensioner arm comprising a distal end for receiving a pulley assembly and a proximal end defining a damping cavity that has a first friction surface, the tensioner arm being rotatable about the pivot axis;

a threaded shaft received in the damping cavity and coupling the tensioner arm to the base;

a threaded nut comprising a second friction surface and a threaded body, wherein the threaded body connects the threaded nut to the threaded shaft with the second friction surface in frictional engagement with the first friction surface of the damping cavity; and a torsion bar attached to the tensioner arm and the base;

wherein the torsion bar biases the tensioner arm in a tensioning direction;

wherein the threaded nut rotates about threading on the threaded shaft in response to movement of the arm;

wherein as the arm rotates in a winding direction the rotation moves the threaded nut about the threaded shaft which translates the threaded nut axially into increased frictional engagement with the arm to provide damping; and wherein the threaded nut is rotatable relative to both the tensioner arm and the base.

17. The tensioner of claim 16 wherein a bushing is positioned between the first surface of the damping cavity and the second surface of threaded nut.

18. The tensioner of claim 16 wherein the first surface and the second surface are generally conically-shaped.

19. The tensioner of claim 16 further comprising a spring having an axially directed biasing force, the spring being connected to the threaded nut, wherein the spring biases the threaded nut to rotate about the threading of the threaded shaft which translates the threaded nut axially into a pre-determined amount of frictional engagement with the arm.

20. The tensioner of claim 19 wherein the pre-determined amount of frictional engagement couples the arm and the threaded nut for rotation together about the pivot axis, wherein as the arm rotates in a tensioning direction the threaded nut rotates about the threaded shaft which axially translates the threaded nut away from the arm for decreased frictional engagement.

21. The tensioner of claim 16 wherein the base has an elongate housing defining a longitudinal cavity coaxial with the axis, wherein the elongate housing houses a portion of the torsion bar.

22. The tensioner of claim 16 further comprising a spring having an axially directed biasing force and comprising a first end and a second end, wherein the first end is connected to the threaded nut and the second end is connected to the base.

23. The tensioner of claim 22 wherein the spring urges the threaded nut to rotate about the threading on the threaded shaft which translates the threaded nut axially into a pre-determined amount of frictional engagement with the arm.

* * * * *